US006163003A

United States Patent [19]
Battisti

[11] Patent Number: 6,163,003
[45] Date of Patent: Dec. 19, 2000

[54] METHOD AND APPARATUS FOR CONTROLLING FORGING FORCE DURING FLASH BUTT WELDING OF RAILWAY RAILS

[75] Inventor: Charles R. Battisti, Chicago, Ill.

[73] Assignee: Chemetron-Railway Products, Inc., Kansas City, Mo.

[21] Appl. No.: 09/096,928

[22] Filed: Jun. 12, 1998

[51] Int. Cl.[7] .................. B23K 11/00; B23K 11/04; B23K 11/24

[52] U.S. Cl. .................. 219/55; 219/97; 228/102; 228/265; 228/44.3

[58] Field of Search .................. 219/53, 54, 55, 219/97, 100, 78.16; 228/102, 265, 8, 9, 44.3

[56] References Cited

U.S. PATENT DOCUMENTS

| | | |
|---|---|---|
| 3,479,480 | 11/1969 | Erwin et al. . |
| 3,479,482 | 11/1969 | Erwin et al. . |
| 3,681,563 | 8/1972 | Lifshits et al. . |
| 3,735,910 | 5/1973 | Watson et al. . |
| 3,925,636 | 12/1975 | Coleman . |
| 4,101,753 | 7/1978 | Buff et al. . |
| 4,103,139 | 7/1978 | Zollinger . |
| 4,208,569 | 6/1980 | Kuchuk-Yatsenko et al. . |
| 4,215,260 | 7/1980 | Zollinger . |
| 4,236,453 | 12/1980 | Cöllen . |
| 4,272,664 | 6/1981 | Theurer . |
| 4,273,984 | 6/1981 | Hara et al. . |
| 4,296,305 | 10/1981 | Lifshits et al. . |
| 4,313,382 | 2/1982 | Bommart .................. 219/53 X |
| 4,317,980 | 3/1982 | Goodrich et al. . |
| 4,376,242 | 3/1983 | Buff et al. . |
| 4,414,454 | 11/1983 | Zollinger . |
| 4,415,793 | 11/1983 | Podola et al. . |
| 4,447,700 | 5/1984 | Cohen . |
| 4,471,203 | 9/1984 | Lebedev et al. . |
| 4,484,057 | 11/1984 | Podola et al. . |
| 4,493,040 | 1/1985 | Vanderhelst . |
| 4,628,176 | 12/1986 | Kojima et al. . |
| 4,645,896 | 2/1987 | Baba et al. . |
| 4,645,897 | 2/1987 | Gourlay et al. . |
| 4,647,750 | 3/1987 | Mosbacher . |
| 4,656,328 | 4/1987 | Weldon et al. . |
| 4,716,836 | 1/1988 | Hardt . |
| 4,717,805 | 1/1988 | Miyagawa . |
| 4,733,044 | 3/1988 | Kuchuk-Yatsenko et al. . |
| 4,929,816 | 5/1990 | Theurer et al. . |
| 4,983,801 | 1/1991 | Theurer et al. . |
| 5,018,666 | 5/1991 | Cryderman et al. . |
| 5,195,436 | 3/1993 | Valditerra . |
| 5,270,514 | 12/1993 | Wechselberger et al. . |
| 5,389,760 | 2/1995 | Zollinger . |

FOREIGN PATENT DOCUMENTS 2481172  10/1981  France .................. 219/55

OTHER PUBLICATIONS

H.A. Schlatter AG (Germany) belived to have been published in 1994, Supra Flex Product brochure.

*Primary Examiner*—Samuel M. Heinrich
*Attorney, Agent, or Firm*—Welsh & Katz, Ltd.

[57] ABSTRACT

A method and apparatus are provided for flash butt weld joining adjacent rail ends on site during initial field installation where at least one of the rails is fastened to the roadbed, and inclosure butt welding rails as in de-stressing long sections of rail track where both rails are fastened to the roadbed. The method and apparatus apply electrical power to the adjacent rail ends while simultaneously effecting relative closing movement between the rails ends through actuating means so as to bring the rail ends into position to effect current flow between the rail ends, and determining a force necessary to move the adjacent ends into a welding position under varying environmental conditions of the rails as the adjacent rail ends close and during flashing of the adjacent rail ends due to the current flow. The determined force is added to a predetermined upset force dependent on the rail cross-section so as to establish a total forging force that forges the adjacent rail ends into a flash butt weld joint using the total forging force.

30 Claims, 6 Drawing Sheets

METHOD AND APPARATUS FOR CONTROLLING FORGING FORCE DURING FLASH BUTT WELDING OF RAILWAY RAILS

FIELD OF THE INVENTION

The present invention relates generally to butt welding of aligned railway rails, and more particularly to a novel method and apparatus for controlling forging force during flash butt welding of railway rails at a roadbed site.

BACKGROUND OF THE INVENTION

Rail butt welders are known. Such devices are generally relatively immobile and are typically maintained in stationary locations where rails to be joined are brought to the butt welder. See, for example, U.S. Pat. No. 5,270,514 which is incorporated herein by reference.

Such rail butt welders are typically constructed with two sets of conductive clamps that make contact with and pull together opposing ends of the lengths of rail that are to be butt welded. One set of clamps is relatively stationary, while the other is moveable. The moveable contact is generally provided with at least one fluid pressure actuated cylinder or ram that is operative to pull a first rail length or section (via the clamped contact) into end-to-end contact, generally termed butted relation, with a second rail section.

One or more power supplies are connected across the contacts formed by the clamps, in series across the butted joint. Activation of the power supplies results in local heating of the joint through a flashing process and ultimately in fusion of the metal forming the joint. The welding process may be divided into a number of phases. For example, a straight flashing phase can be used to burn away any projections or unevenness on either face of the butted joint. The straight flashing phase is followed by a preheat phase where a low duty cycle may be used to uniformly heat each rail end. The preheat phase is followed by a final flashing phase where the rail ends are burned off at a progressive rate to eliminate oxide inclusions and any cratering that has developed during previous phases. Finally, an upsetting and forging phase is effected wherein the contacting ends of the rails are forced (forged) together at a predetermined pressure to a point of refusal, not to a fixed distance such as a limit switch point.

During the straight flashing phase, the rate of close between the rail ends generally begins at a relatively low rate and is increased as the opposing rail ends become hot enough to sustain flashing. Current is detected and closing may be reversed if excessive current develops, indicating that the current arc has been extinguished. Control of the rate of close may be achieved by controlling the rate at which fluid flow is introduced into the actuating piston or ram that brings the rail ends together.

During the preheat phase, the rail ends are repeatedly separated until a power set point is satisfied. The total energy introduced into the rail ends is calculated per unit time to produce a constant rate of rise in rail temperature in the butted ends of the rails. The butted ends may be intentionally separated between pulses to avoid freezing of the metal, and the formation of localized short circuits. In the final flashing phase, the energy dissipated between the butted rail ends is intentionally increased. Significantly more energy is ejected from the weld area as metal splash than in further heating.

In the final step, the butted rail ends are forged (i.e., forced) together at a predetermined force that may be as high as 9000 psi. The welded joint is then quenched to achieve a desired metallurgy.

The rail butt welding process thus far described has been found to be effective in factory or plant rail production facilities for creating strings of rail where discrete lengths of rail on one or both sides of the intended butt weld are supported by roller conveyors or other supports enabling low drag longitudinal movement of the aligned rails relative to each other. The extension of the aforedescribed process to on-site butt welding of varying lengths of rail supported on or adjacent a roadbed has been inhibited by a perceived difficulty of precisely controlling the forging process.

On-site or roadbed-site butt welding of railway rails presents problems not present in butt welding lengths of rail at an off-site factory or plant production facility. For example, in the case of initial field installation of railway rails (where at least one rail is not fastened to the roadbed), the rail to be welded may vary in length from relatively short lengths, i.e., approximately 14 feet in the case of insulated joints, to lengths in excess of 2000 feet. The rail may also be supported under different conditions such as laying to the side of the right-of-way, directly on the ballast, on the track plates, or a combination of these conditions. Also, track machinery may be present either on or off the rail being welded. All of these factors establish the environmental conditions of the rail and contribute to vary the force required to move two rails together in a fashion to form a flash butt rail weld. This force requirement may be referred to as the drag force.

On-site closure welding of adjacent ends of railroad rails where both rails are fastened to the roadbed also presents problems not encountered in flash butt welding of rails in a plant production facility. During field or on-site closure welding of railroad rails to relieve stress in long sections of rail fastened to the roadbed, the welding machine must "stretch" the two rails together in order to form a flash butt railroad rail weld. The amount of stretch force required is highly environment dependent.

Accordingly, a need exists for a method and apparatus for affecting butt welding of railroad rail ends at a roadbed site and which facilitates controlled forging force flash butt welding of various length rails in initial field installation and in closure welding requiring different drag and stretch compensation.

SUMMARY OF THE INVENTION

One of the primary objects of the present invention is to provide a novel method and apparatus for controlling the forging force during on-site flash butt welding of railroad rails so as to attain a consistent and repeatable forging force at the rail butt ends under varying environmental conditions.

A more particular object of the present invention is to provide a novel method and apparatus for controlling the forging force during on-site flash butt welding of railroad rails in both on-site initial installation of rails and closure welding of rails already fastened to the roadbed by automatically sensing, calculating and compensating for different drag and stretch forces encountered under varying environmental conditions.

Another object of the present invention is to provide a novel method and portable apparatus for controlling the forging force during on-site flash butt welding of railroad rails wherein fluid pressure transducers measure the rod side and blind side pressures of upset fluid pressure cylinders coupled to the adjacent rail ends and are interfaced with a controlling computer that calculates and averages and filters the instantaneous drag force over a given distance of flashing immediately prior to the upset or forging phase of the welding process, and adds the calculated drag force to the required forging force for a given rail cross-section so as to deliver an appropriate total upset force to the rail ends.

A feature of the method and apparatus for on-site flash butt welding of railroad rails in accordance with the present invention lies in the use of a proportional fluid pressure control valve that is associated with the rail upset cylinder and is interfaced to a controlling computer system that calculates the drag force and provides a consistent and repeatable upset forging force at the rail butt ends so as to effect high quality flash butt welds under varying environmental conditions.

In carrying out the present invention, a method and apparatus are e provided for butt-weld joining a adjacent ends of railway rails at a track roadbed site, and wherein different drag and stretch characteristics of the rails are compensated for in controlling the forging force applied during flash butt welding. The method and apparatus are operative to apply electrical power to the adjacent rail ends while simultaneously effecting relative closing movement between the rail ends through actuating means so as to bring the rail ends into position to effect current flow between the rail ends. The force necessary to move the adjacent rail ends into welding position under different drag and stretch force characteristics as the adjacent rail ends close and during flashing of the rail ends due to current flow is then determined. The method and apparatus add the drag force required to effect relative closing movement of the rail ends to a predetermined required forging force that is constant with the rail section surface area so as to establish a total upset force and forge the adjacent rail ends into a weld joint.

Further objects, features and advantages of the present invention, together with its organization and manner of operation, will become apparent from the following detailed description of the invention taken in conjunction with the accompanying drawings wherein like reference numerals designate like elements throughout the several views.

DETAILED DESCRIPTION OF A PREFERRED EMBODIMENT

Figure 1:
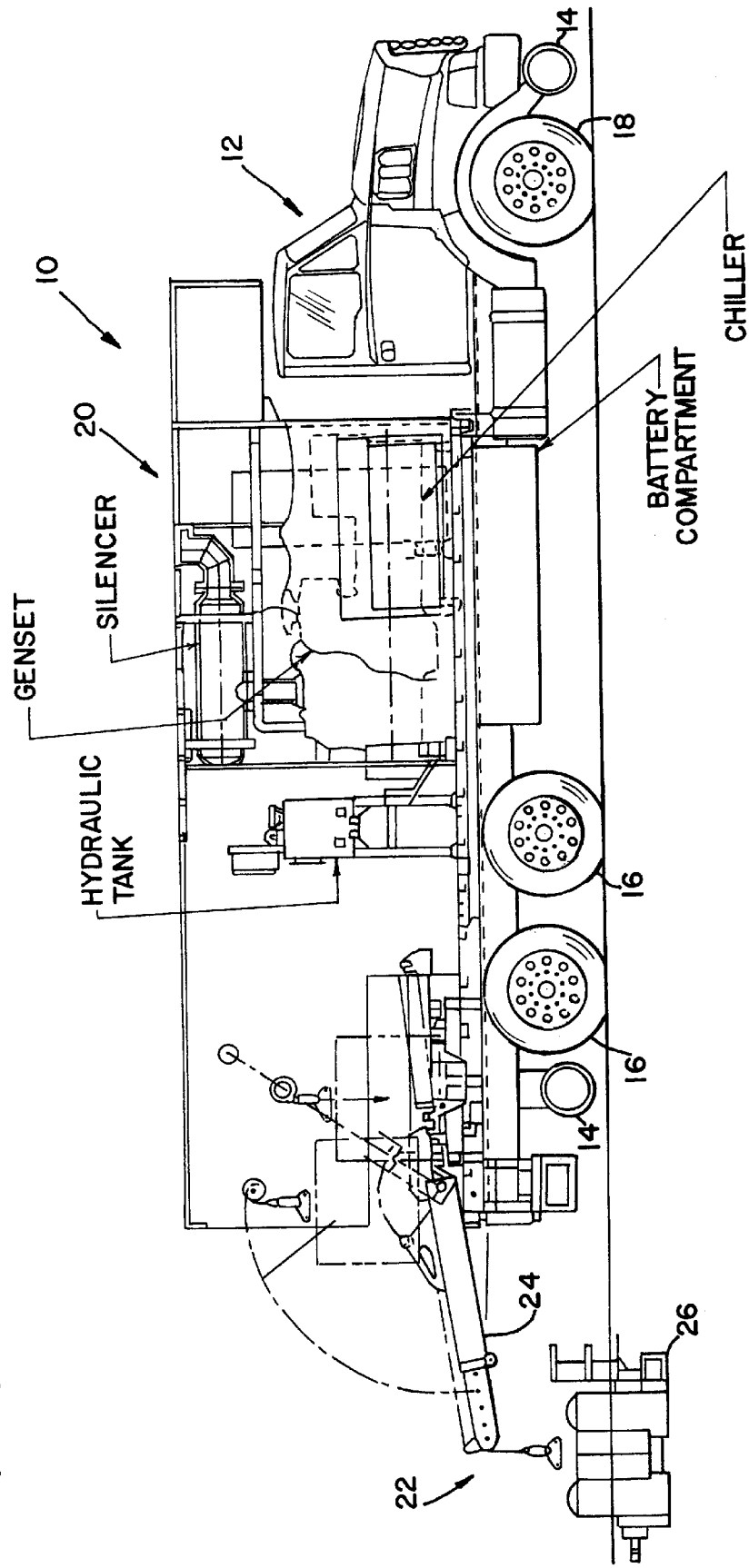
FIG. 1 is a side elevational view of a railroad rail welding system employing apparatus for flash butt welding adjacent rail ends in accordance with the present invention.

Referring now to the drawings, FIG. 1 is a side elevation view of a mobile railway wielding and forging system, indicated generally at 10, which may be employed in carrying out the present invention. Included within a the system 10 are a transport device 12 (e.g., a truck vehicle chassis), a power source 20 (e.g., a generator set and hydraulic pump) and a weld head assembly 22.

The truck chassis 12 is of conventional design and includes a set of adjustable flanged wheels 14. When lowered, the flanged wheels 14 allow the chassis 12 to ride on top of conventional railway rails (not shown). A set of drive wheels 16 allows the chassis 12 to p proceed along the railway tracks to a weld site. The flanged wheels 14 may be raised, as shown in FIG. 1, to enable the chassis 12 to be driven to a weld site along a road or highway (or overland) using the drive wheels 16 and steering wheels 18.

The weld head assembly 22 generally includes a crane 24 of known design and a weld head apparatus 26. The crane 24 may be rigidly secured to the truck chassis and powered by the power source 20. The crane 24 is operative to move the weld head 26 from a position as shown in phantom on the back of the chassis 12, to a position directly over a railway rail to be welded.

Figure 2A:
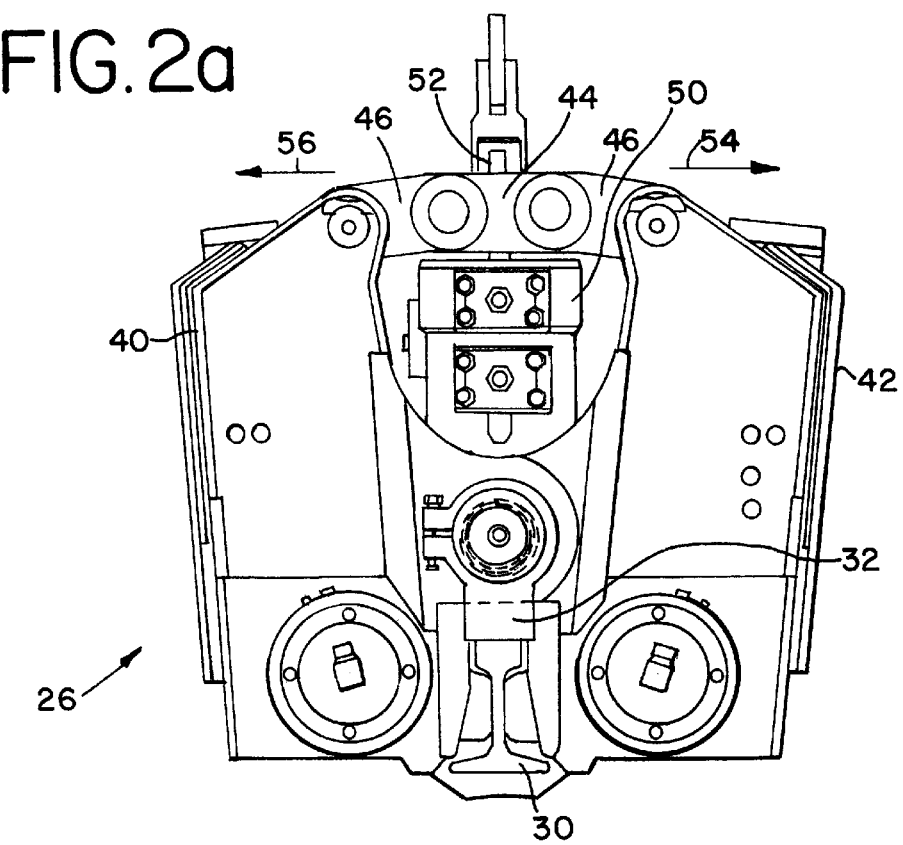
FIGS. 2a–b depict end and side views, respectively, of the weld head apparatus of the rail welding system of FIG. 1.
Figure 2B:
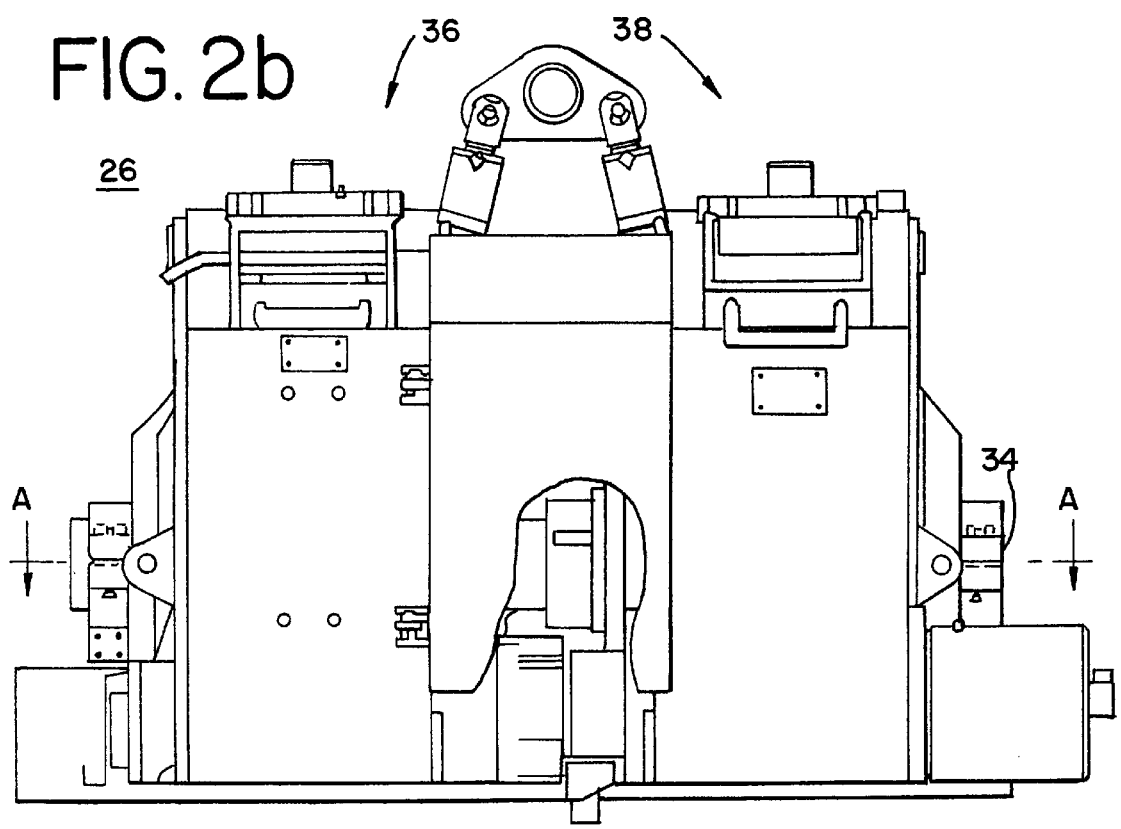

As shown in FIG. 2a, the weld head 26 is configured to be placed on top of a railway rail 30 with a top contact 32 making contact with a top surface of the rail 30. First and second clamp assemblies 36 and 38 (FIG. 2b) are provided to clamp opposing ends of the rails 30 that are to be butt welded together. A longitudinally oriented fluid pressure cylinder in the form of a hydraulic forging actuator 34 functions to draw the first and second clamp assemblies 36, 38 (and the clamped butted rail ends) together during the forging operation.

Figure 3:
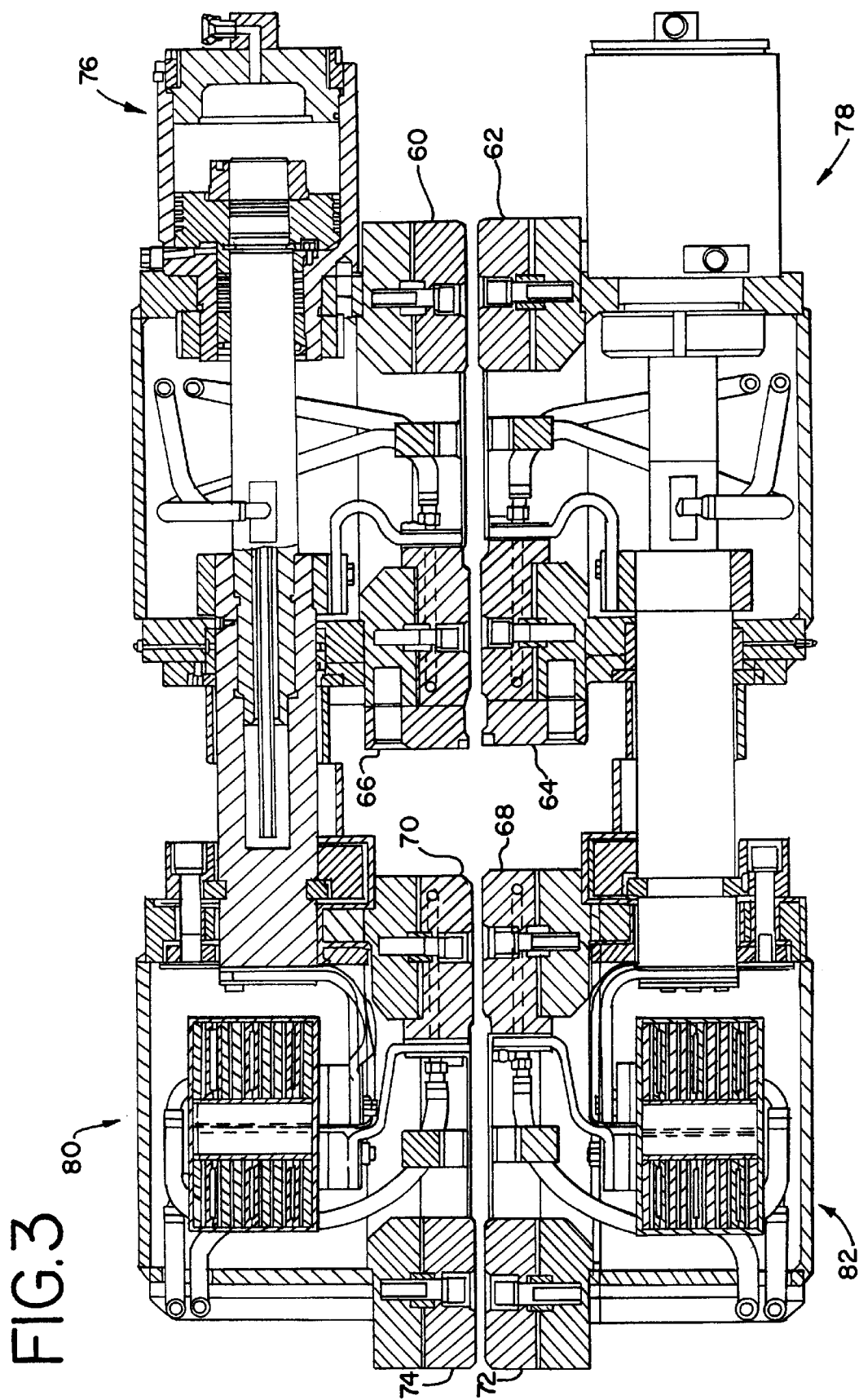
FIG. 3 is a longitudinal sectional view of the weld head of FIG. 2a–b, taken horizontally along section line A—A of FIG. 2b.

FIG. 3 shows contacts 60, 62, 64, 66, 68, 70, 72, 74 used to grasp the web of the rail 30 as illustrated in FIG. 2a. An inner set of rail contacts 64, 66, 68, 70, closest to the butted joint (not shown), provides a primary current path for the welding current. An outer set of rail contacts 60, 62, 72, 74 provides additional grasping force to reduce slipping during forging of the butted rail ends. A set of transformers 80 and 82 are coupled to the inner contacts 64, 66, 68 and 70 to provide welding current to the butted joint.

Each clamp assembly 36, 38 includes first and second pivoting clamp supports 40 and 42 (FIG. 2a) each of which pivots about a central shaft of the longitudinal forging actuator 34. A hydraulic clamp actuator 50 is provided for each clamp assembly 36, 38 which causes a top portion of each clamp assembly 36, 38 to move outwards during clamping of the rail 30 as shown by arrows 54, 56 (FIG. 2a).

The clamp actuator 50 is coupled to the forging actuator 34 on a first end and to a central link element 44 on a second end. A pair of floating links 46 is provided on each side of the central link element 44.

In an unclamped state, the link element 44 lies above the floating links 46. To clamp the weld head to the rail 30, the central link 44 is pulled in the direction of the forging actuator 34, causing the central link 44 and floating links 46 to align themselves in a generally straight line. As the central link 44 and floating links 46 begin to align themselves the upper portion of each pivoting clamp support 40, 42 is forced outward as shown by arrows 54, 56. The outward movement of the upper portion of each pivoting clamp support 40, 42 causes the bottom portion of each pivoting clamp support 40, 42 to pivot inward against each side of the web of the rail 30, thereby clamping the rail.

Figure 4:
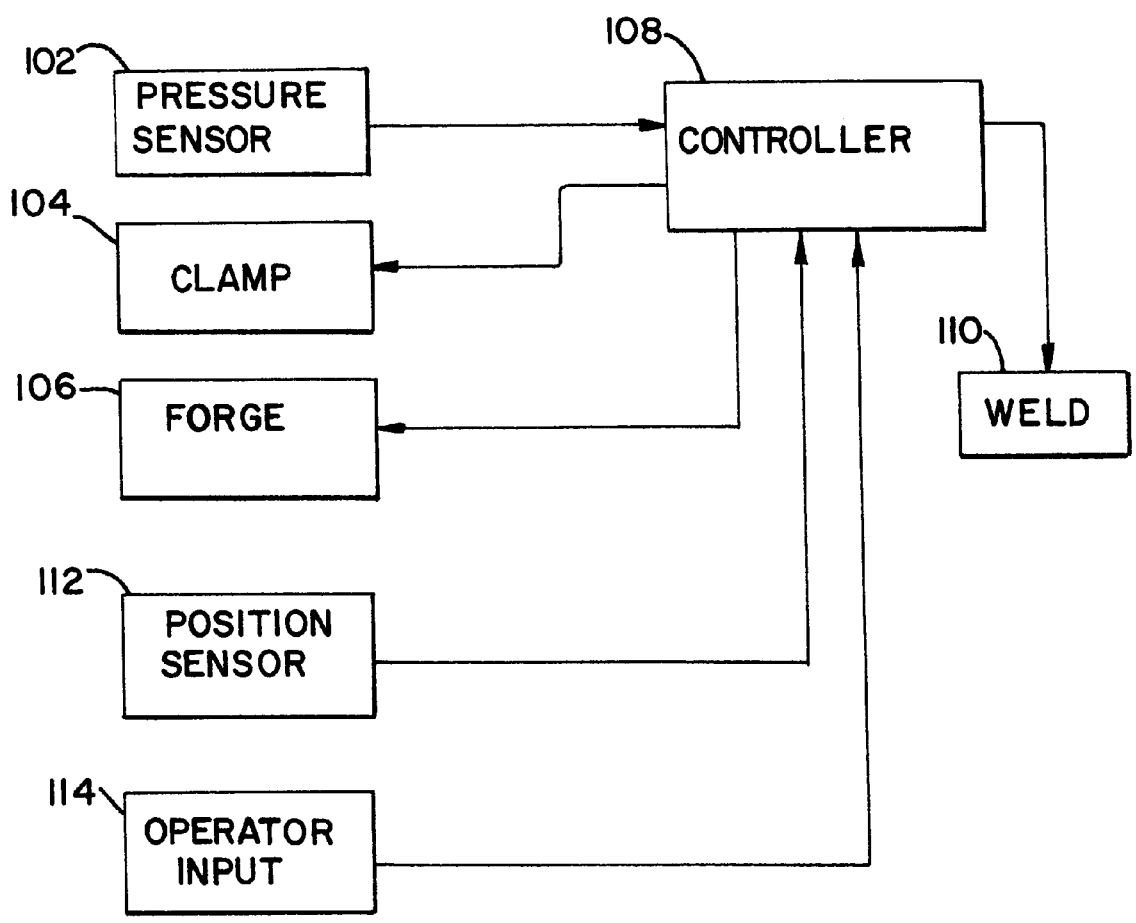
FIG. 4 is a block diagram of a control schematic of the welding apparatus of FIG. 1.

FIG. 4 is a block diagram of a control system 100 that may be used to control the welding process using the system 10. A controller 108 clamps the rail 30 by activation of a solenoid valve 104. Welding current from the two transformers 80, 82 may be controlled by a control signal passed from the controller 108 to an SCR phase controller 110. Control of the forging actuator 34 may be provided through a variable hydraulic flow solenoid (proportional pressure control valve) 106 based upon a sensed fluid pressure within the forging actuator 34 provided by a fluid (i.e., hydraulic) pressure sensor 102.

The welding system 10 may be used to control a forging force during flash butt welding of railway rails in the case of initial field installation, where at least one rail is not fastened to the roadbed. The welding system 10 may also be used for closure welding (e.g., for de-stressing of long sections of track where both rails are fastened to the roadbed).

The system 10 solves a problem which does not occur with plant production railroad rail welding. As aforedescribed, in plant production railroad rail welding, the rail sections to be butt welded are generally no more than approximately 80 feet long and at least one of a pair of rails to be welded together rests on roller conveyors. As a result, the force required to move the rail to be welded is consistent and predictable due to relatively minimal drag or resistance to longitudinal movement.

The system 10 has been found to be effective for flash butt welding of rails during field welding operations to assemble rails into a track. In field or on-site welding operations, the railroad rail to be welded can be much longer than that experienced in plant production welding (sometimes exceeding 2000 feet), and sometimes much shorter (approximately about 14 feet in the case of insulated joints). The length of the railroad rail also typically changes from weld to weld.

During field or on-site butt welding, the railroad rail may be lying adjacent the right of way, directly on the ballast, on the track plates, or any combination of these conditions. Moreover, track maintenance machinery may be located on the rail being welded. Thus, the force required to bring the two rails together for flash butt welding can change according to individual environmental conditions.

During field welding operations of long lengths of railroad rail that are fastened to the roadbed, the welding system 10 must stretch the two rails together in order to form a flash butt weld. Again, the amount of force required to stretch the rails is highly environmentally dependent.

It has been found that the total upset force required during the upset (forging) process of the weld cycle is equal to the sum of the required forging force and the closing force required to bring the two rails together. (For purposes of description, the closing force may be referred to as a drag force, even though the drag force has an elastic component.) In contrast to the environmentally dependent drag force, the forging force is relatively constant depending upon the cross-sectional area of the rail and the chemistry of the rail.

In the illustrated embodiment, the drag force may be determined on-the-fly during the flashing process of the welding cycle. During this process, the two rails are dragged toward each other while the butts of the two rails are "flashed" or "burned" away. During the flashing operation, it has been found that there is substantially no squeezing or compression of the butt face of either rail during the flashing process. More specifically, it has been found that during the flashing operation, the force required to bring the butt ends of the rails together is substantially equal to the drag force alone.

The actual drag force experienced during forging is not an easily measured quantity. It has been found that in order to directly measure drag, one would have to sever one of the two butted rails and insert a force transducer or load cell between the severed ends. However, severing a rail would defeat the purpose of butt welding and is therefore impractical.

In accordance with the present invention, the drag force required to move the rails is determined indirectly by using pressure readings from hydraulic pressure sensors 102 coupled to the forging actuator 34. The sensors 102 are coupled to the rod side and the pressure side of a piston of the actuator 34. The net force delivered is calculated by first determining the forces acting on each side of the piston by multiplying sensed pressure by an area on each side of the piston. The forces delivered to each side of a piston are then subtracted to provide the net force delivered.

At the forging point of the weld, the calculated drag force (averaged and filtered) is added to the required forging force (preset for the cross-sectional area of a given rail section). The forging actuator hydraulic pressure is then continuously adjusted by position to deliver the total upset force (i.e., the sum of the calculated drag force and forging force).

The hydraulic pressure of the forging actuator is adjusted through the use of the hydraulic proportional pressure control valve 106 coupled to the controller 108. It should be noted that the calculated drag force is determined by differences in pressure on both sides of the piston of the forging actuator 34. In contrast, the total upset force during forging may be calculated from only one side of the forging actuator 34 (and associated surface area), since the other side is valved to a hydraulic reservoir at zero pressure.

The drag force discussed above may be considered as being made up of two components. A first component may be regarded as the total force required to drag the two lengths of rails together. In certain cases (discussed below), the first component may be the only component considered in the forging operation.

The second component of the drag force may be regarded as a stretching of the rails. The second component assumes that each rail is secured at a respective distal end and that the only mode allowing closure of the gap of the butt weld is through a stretching of the respective rails. In certain cases (also discussed below), the second component may be the only component considered in the forging operation.

The stretch force is determined based upon pressure readings from the pressure sensors 102 and the respective position determined by a position sensor 112. The stretch force is sampled and recorded along with the distance between samples for a fixed length immediately prior to the point where forging begins (i.e., "the upset (forging) point"). The distance between samples is held constant.

At the upset (forging) point of the weld cycle, the stretch force rate is calculated by inserting the stretch force samples and the distance between samples into a curve fitting routine. The stretch force being exerted at the upset point is also recorded.

During the upset (forging) process (where stretch force alone is used as the drag force), the required forging force (preset for the surface area of a given rail section) is added to the stretch force being exerted at the upset point. This sum is added to the product of the stretch force rate and the measured distance (constantly increasing during the upset process until refusal of the parent steel stops advance motion). The hydraulic pressure of the forging actuator 34 is continuously adjusted to deliver this total upset force.

Flash butt welding of the rail 30 may be accomplished in four phases. During a first phase a straight flashing process may be used to burn the rail ends evenly to eliminate any mill irregularities, surface rust, uneven saw cuts and any accumulated grease or grime.

Straight flashing may be followed by a preheating phase and a final flashing phase. The final flashing phase may be followed by an upsetting and forging phase.

Power control of the welding power supply 110 by the controller 108 during flashing welding may in general be accomplished as described in U.S. Pat. No. 5,270,514.

Figure 5:
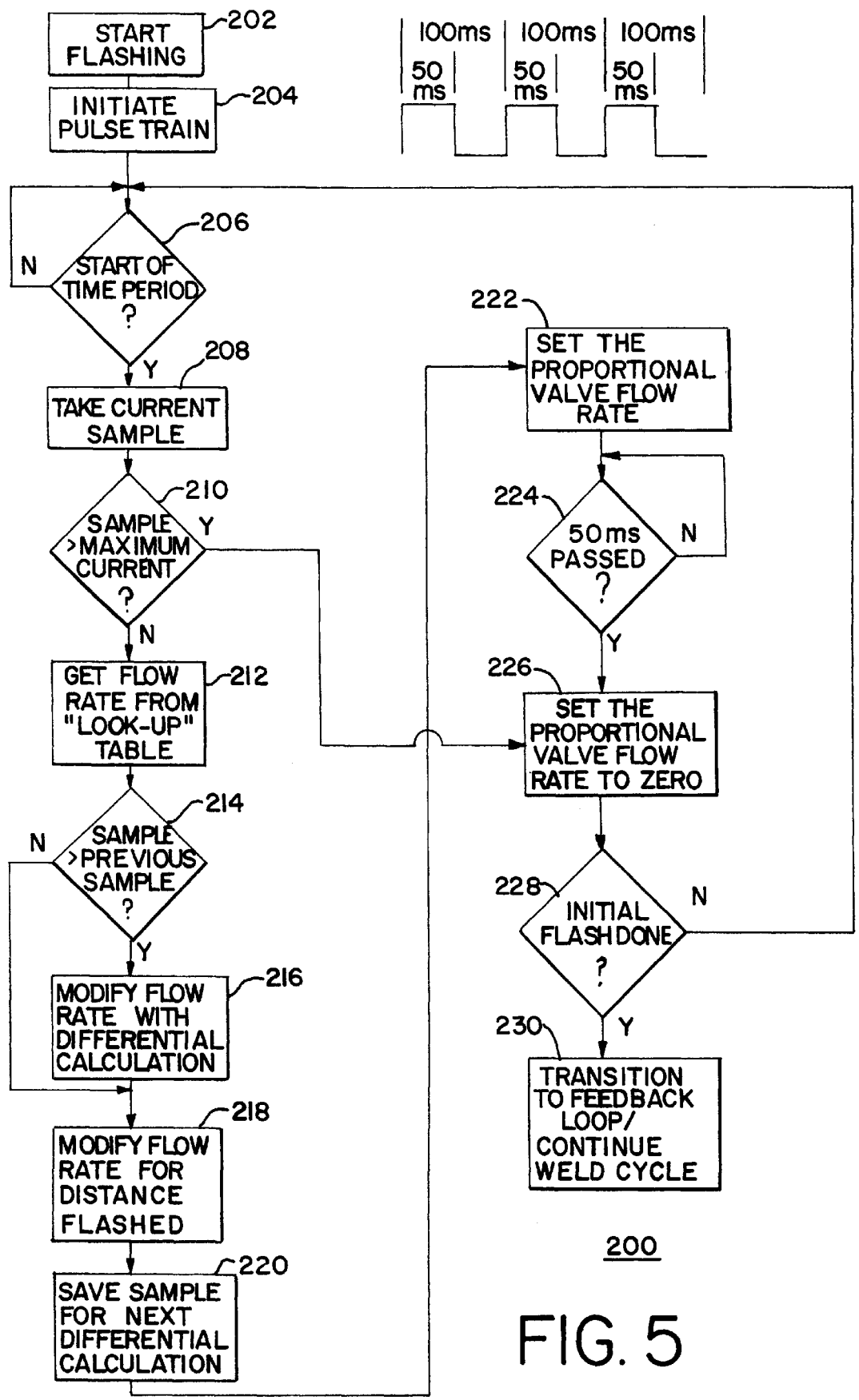
FIG. 5 is a flow chart illustrating the control of fluid pressure flow to a forging actuator of the rail welding apparatus of FIG. 1.

During the straight flashing phase, the rate of closing of the adjacent ends of the rail sections 30 (as with the other phases) is controlled by the controller 108. FIG. 5 shows a flow chart of proportioning valve 106 control during the straight flashing phase.

A pulse train with a period of 100 milliseconds (e.g., 50 ms high and 50 ms low) is provided as a time base by the controller 108. During the first 50 ms, the proportional flow control valve 106 is allowed to open (or to allow flow at a rate described in the following paragraph). During the second half of the period (the second 50 ms period of the 100 ms interval) the proportional flow control valve 106 is closed (i.e., the flow is set to zero).

The amount of welding current being drawn is sampled at the start of each 100 ms period. A desired flow rate of the proportional control valve 106 is determined. An initial value is retrieved from a look-up table (e.g., if the welding current sample is 45 amps and the maximum weld current is 75amps, then the look-up table value for the proportional control valve 106 would be 60% of a maximum rate). If the sampled welding current exceeds a threshold value 210, then the flow rate of the proportional valve 106 is immediately set to zero 226.

Where the sampled current does not exceed the threshold value, the flow rate is modified by a differential calculation 216. The new flow rate through the proportioning valve 106 is determined by the change in welding current from the previous sample. If the new sample increases dramatically, the flow value is reduced dramatically. The new flow rate is further modified 218 by adding a constant determined from the relative position of flashing (e.g., if the weld has been flashing for 0.15 inches travel of the forging actuator 34, increase the flow value by 10%). The new flow rate is stored 220 for the differential calculation of the next period.

For each 100 ms cycle, the flow rate is set to the new flow rate for the first 50 ms. On the second 50 ms of the 100 ms cycle, the flow rate is set to zero. The 100 ms cycles repeat, calculating a new flow rate for each cycle, until the preset straight flashing distance has been completed. By this point in the flashing cycle, sufficient heat has been deposited into the rail ends such that a conventional feedback loop will sustain flashing (and ensure a constant current draw from the motor-generator set).

The two rails approach each other in variable incremental steps of 50 ms duration during the straight flashing phase. In this manner, if an over-current situation occurs, the surface area of contact between the two butted ends of the rails would be small and could be easily burned away.

Further, the 50 ms of no motion on the second half of the 100 ms cycle allows the power supply to react. The 50 ms of no motion allows the field of the motor-generator to build in response to increases in current flow.

During the straight flashing, preheat and final flashing phases, a predetermined quantity of heat is deposited into the rail ends. Once the heat level has reached a sufficiently high level the ends may be forged. At this point, the current flow to the rail ends is terminated. In order to forge the ends, the drag force must be calculated.

In order to perform the drag force calculations, two inputs may be required for input to the controller 108. First, the relative position of the two rails during the flashing and upsetting phases may be determined for each portion of the welding cycle. The relative position of the two rails is provided by the position sensors 112.

Second, the force required to move the two rails together during the flashing stage of the welding cycle may be determined. The force required to move the two rails is derived from the forging actuator pressure detected by the pressure sensors 102. Based upon these inputs, an output to the proportioning valve 106 is provided from the controller 108.

A short description of the methods for obtaining these inputs and providing these outputs will now be provided. The position transducer (sensor) 112 converts a physical position of the rail ends to an electrical output. For example, at 0 inches of displacement the electrical output would be 0 volts DC and at 6 inches displacement the electrical output would be 10 volts DC. The 0–10 volts DC signal is a standard for industry that may be interfaced to any number of A/D (analog to digital) modules that may be configured to work in conjunction with the controller 108.

Many different position transducers exist in industry today, and almost any of them may be adapted for use in this application. Under one embodiment a linear resistor may be chosen because of the inherent simplicity, noise immunity, durability, and low cost.

Once converted to a digital format (through the A/D), the controller 108 may "scale" the raw binary data to real world variables. For this application, the absolute position (relative to the physical end point of the linear resistor) of the actuator 34 may be determined at any given time.

Within the controller 108, this value may be reliably calculated every 0.005 seconds (faster if need be). For all practical purposes for the application being described, the calculated position may be considered real time.

A force required to move the two rails may then be determined. The pressure transducer converts a hydraulic pressure (relative to atmospheric pressure) to a linearized electric current output. For example, at 0 psi the electrical output would be 4 milli-amps and at 5000 psi the electrical output would be 20 milli-amps. The 4–20 milli-amp signal is a standard for industry that may be interfaced to any number of A/D (analog-to-digital) modules that may be configured to work in conjunction with the controller 108.

Once converted to a digital format (through the A/D), the control computer can "scale" the raw binary data to real world variables. For this application, the force detected on one side of a hydraulic cylinder (in tons) would equal: 1) the hydraulic (fluid) pressure (i.e., a variable, sensed by the pressure transducer, and converted by the A/D to psi), multiplied by: 2) the surface area of the piston of the hydraulic (fluid pressure) cylinder (i.e., a constant value, in square inches), divided by: 3) 2000 (i.e., 2000 pounds force per ton).

The amount of force a hydraulic cylinder is exerting on an external system (through the cylinder rod) at a particular instant in time with the cylinder collapsing (i.e., with the rod being retracted into the cylinder) may be determined by: 1) calculating the force exerted by the rod side of the hydraulic cylinder; 2) calculating the force exerted by the blind side of the hydraulic cylinder; and 3) subtracting 2 from 1.

It will be understood that two pressure transducers are needed (one connected to the rod side cylinder port and one connected to the cap side cylinder port) and the respective surface areas of the piston of the hydraulic cylinder of the actuator 34 to perform this calculation.

Since the Conservation of Force Laws must be satisfied, this calculated force would equal the force exerted by the cylinder rod at the particular instant in time when the pressure samples were taken.

With the pressure transducers and the control computers provided, this value may be reliably calculated every 0.01 seconds (faster if need be). For all practical purposes and the application being described, the calculated force may be considered real time.

An upset forging force may then be determined. Once the upset forging force is determined it may be converted to a controlling electrical signal and provided as an output to the proportioning valve 106. The proportional pressure control signal may be used to change the pressure setting of a hydraulic pump by control of the position of a swash plate within the pump by operation of the proportioning valve 106. The pressure setting is dependent upon a 0–10 volt DC signal. For example, at 0 volts DC the pressure setting of the pump would be 600 psi, while at 10 volts the pressure setting of the pump would be 4500 psi. The physical forge force per volt DC may be determined using these pressures and the surface area of the pistons of the upset cylinders.

The 0–10 volt DC signal that may be provided as an output is also a standard for industry that may be interfaced to any number of D/A (digital to analog) modules that work in conjunction with the controller 108. The control computer can scale the D/A such that a "program" output of 20 tons would result in the required pump pressure to achieve 20 tons physical upset force. The actual reaction time required to change the pump pressure is greatly inhibited by the mechanical motions of the pump swash plate and designed in hydraulic dampening. Generally speaking, The time required to change pump pressures from 10% to 90% (standard rise time specifications) would be 0.250 seconds (well within the limits of the system described).

Figure 6:
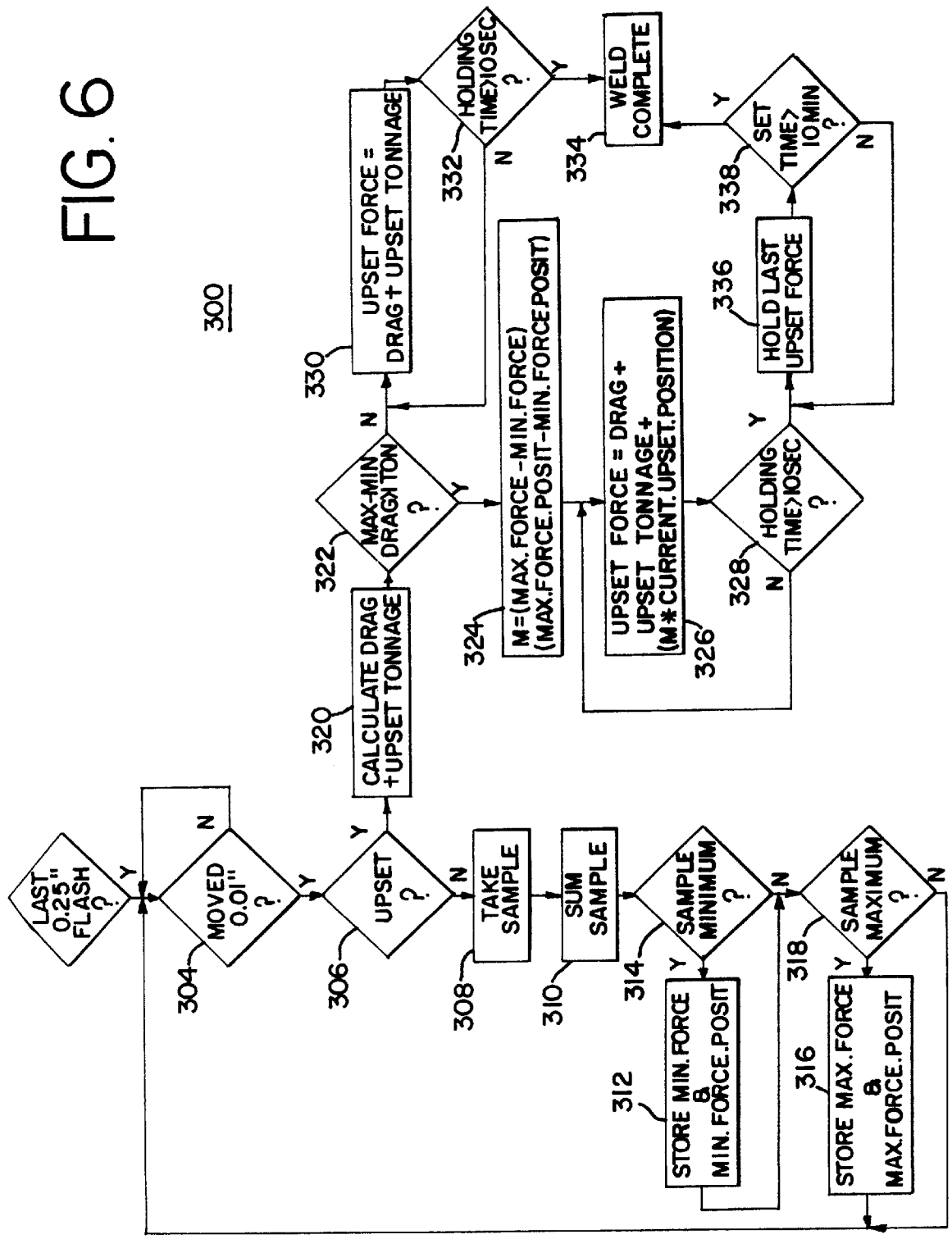
FIG. 6 is a flow chart illustrating the sequence of force calculations used by the welding apparatus of FIG. 1.

Drag and stretch data may then be collected. FIG. 6 may be used for reference as appropriate to an understanding of the invention. The controller 108 continuously calculates the amount of force that is being exerted by the rod of the hydraulic upset actuator 34 during a weld cycle, as previously described. This force is equal to that required for moving the two rails toward each other (conservation of force law). The force is sampled during the last ¼ inch 302 immediately prior to upset and has been found to provide a best estimate what will occur during the upset stage of welding.

First, samples are taken 308 at a rate of one sample per 0.01 inches 304 during the last ¼ inch of flashing immediately prior to upset 306 (the sample rate is distance dependent). The total number of samples may be 25 although a running total is also kept.

Next, the maximum force detected 318 during the sample distance is recorded 316 along with the relative position where it occurred. Third, the minimum force detected 314 during the sample distance is recorded along with the relative position 312 where it occurred.

Drag compensation may then be calculated. The drag force is calculated at the point of upset. This is simply the average of the drag force samples taken (the sum of the drag force samples divided by the number of drag force samples, 25 samples in the case described above).

This drag force value may be considered a constant and when used alone may simply be summed with the forging force (preset for the surface area of the rail section being welded).

Stretch compensation may be calculated. If the difference between the maximum and minimum drag force sample is less than one ton 322, the stretch compensation calculation is disabled. This is an automatic function, since the time required for an operator to reach a decision in this regard would not be possible.

The stretch force calculation is a simple curve fitting process. In this case, two sample points are acquired are used. Specifically, these samples are the maximum and minimum drag forces (MaxDrag, MinDrag) along with their respective absolute positions (MaxDragPosition, MinDragPosition). This data is collected during the last ¼ inch of flashing immediately prior to upset.

The stretch calculation is used to fit the data to a straight line (the 2 points collected are used to define a straight line) using the equation, Y=MX+B, where: Y equals the calculated stretch force result; M is the rate of the rail stretch (as calculated from the two drag sample points); X is the absolute position of upset in increments of 0.01 inches (0.00 inches being the point of upset, increasing from that point); and B is a constant offset. M is determined by the ratio of MaxDrag-MinDrag)/(MaxDragPosition-MinDragPosition) and is provided in units of tons/0.01 inches. The constant offset, B, consists of the sum of: 1) calculated drag force at the point of upset, and 2) forging force (preset for the surface area of the rail section being welded).

The rate of rail stretch (M) and the constant offset (B) are calculated 320 at the point of upset. The stretch calculation force result (Y) is continuously calculated (326 or 330) during the upset holding time (328 or 330) (10 seconds for this application). After the upset holding time is completed, the upset force is held constant for the required set time 338 (as long as 10 minutes). The constant compression during the set time is required so that the hot weld is not pulled apart by the residual forces left in the rail.

It should be clear that the calculated stretch force will increase as the upset position increases, just as the force required to stretch the rail would increase with displacement.

More elaborate curve fit routines may be inserted into this process. This may simply require a program change. With the physical method herein described for obtaining distant dependent drag samples and utilizing all 25 resulting samples, a curve fit routine may be constructed that would yield a 24th order equation. For all practical purposes, the straight line curve fit routine works quite well.

A specific embodiment of the method and apparatus of flash welding railroad rails in accordance with the present invention has been described for the purpose of illustrating the manner in which the invention is made and used. It should be understood that other variations and modifications of the invention and its various aspects may be made without departing from the invention in its broader aspects. Thus, invention is not limited by the specific embodiments described, but covers all modifications, variations and equivalents that fall within the true spirit and scope of the invention as defined in the appended claims.

What is claimed is:

1. A method of weld joining adjacent rail ends comprising the steps of:

applying electrical power to the adjacent rail ends while simultaneously effecting relative closing movement between the rail ends through actuating means so as to bring the rail ends into position to effect current flow between the rail ends;

determining a force necessary to move the adjacent rail ends into a welding position as the adjacent rail ends close and during flashing of the adjacent rail ends due to the current flow;

selecting an upset force per unit area, and establishing a predetermined upset force by multiplying the upset force per unit area by a cross-sectional area of the adjacent rail ends;

adding the determined force to said predetermined upset force to determine a total forging force; and forging the adjacent rail ends into a weld joint using the total forging force.

2. The method as defined in claim 1 further comprising the step of terminating the current flow before forging the adjacent rail ends into the weld joint.

3. The method as defined in claim 2 further comprising the steps of measuring a total power input to the adjacent rail ends, and terminating the current flow when the total power absorbed by the adjacent rail ends exceeds a predetermined power threshold.

4. A method of weld joining adjacent rail ends comprising the steps of:

applying electrical power to the adjacent rail ends while simultaneously effecting relative closing movement between the rail ends through actuating means so as to bring the rail ends into position to effect current flow between the rail ends;

determining a force necessary to move the adjacent rail ends into a welding position as the adjacent rail ends close and during flashing of the adjacent rail ends due to the current flow;

adding the determined force to a predetermined upset force to determine a total forging force;

forging the adjacent rail ends into a weld joint using the total forging force;

terminating the current flow before forging the adjacent rail ends into the weld joint; and measuring a total upset distance of closing of the rail ends during forging after termination of the current flow.

5. The method as defined in claim 4 further comprising the steps of specifying a range of predetermined upset distances, and rejecting the weld joint where the measured upset distance of forging exceeds the range of predetermined upset distances during a measured upset time period.

6. A method of weld joining adjacent rail ends comprising the steps of:

applying electrical power to the adjacent rail ends while simultaneously effecting relative closing movement between the rail ends through actuating means so as to bring the rail ends into position to effect current flow between the rail ends;

determining a force necessary to move the adjacent rail ends into a welding position as the adjacent rail ends close and during flashing of the adjacent rail ends due to the current flow:

measuring a distance of movement of the adjacent rail ends as the adjacent rail ends close and flash due to the current flow;

adding the determined force to a predetermined upset force to determine a total forging force; and forging the adjacent rail ends into a weld joint using the total forging force.

7. The method as defined in claim 6 wherein the step of measuring the distance of movement further comprises correlating the measured force to the measured distance.

8. The method as defined in claim 7 wherein the step of correlating the measured force to the measured distance further comprises determining an elastic constant from a change in measured force per change in unit distance.

9. The method as defined in claim 8 wherein the step of correlating the measured force to the measured distance further comprises determining a drag force from a relatively constant measured force observed over at least a portion of the measured distance.

10. The method as defined in claim 8 wherein the step of determining the force necessary to move the adjacent ends further comprises selecting the drag force when available and otherwise the elastic constant.

11. The method as defined in claim 10 wherein the step of determining the force necessary to move the adjacent ends further comprises multiplying the elastic constant by the measured distance.

12. Apparatus for weld joining adjacent rail ends comprising:

means for applying electrical power to the adjacent rail ends while simultaneously effecting relative closing movement between the rails ends through actuating means so as to bring the rail ends into position to effect current flow between the rail ends;

means for determining a force necessary to move the adjacent ends into a welding position as the adjacent rail ends close and during flashing of the adjacent rail ends due to the current flow;

means for selecting an upset force per unit area and determining a predetermined upset force by multiplying the upset force per unit area by a cross-sectional area of the adjacent rail ends;

means for adding the determined force to said predetermined upset force to determine a total forging force; and means for forging the adjacent rail ends into a weld joint using the total forging force.

13. The apparatus as defined in claim 12 further comprising means for terminating the current flow before forging the adjacent rail ends into the weld joint.

14. The apparatus as defined in claim 13 further comprising means for measuring a total power input to the adjacent rail ends and terminating the current flow when the total power absorbed by the adjacent rail ends exceeds a predetermined power threshold.

15. The apparatus as defined in claim 14 further comprising means for measuring a total upset distance of closing of the rail ends during forging after the termination of the current flow.

16. The apparatus as defined in claim 15 further comprising means for specifying a range of predetermined upset distances and rejecting the weld joint where the measured upset distance of forging exceeds the range of predetermined upset distances during a measured upset time period.

17. Apparatus for weld joining adjacent rail ends comprising:

means for applying electrical power to the adjacent rail ends while simultaneously effecting relative closing movement between the rails ends through actuating means so as to bring the rail ends into position to effect current flow between the rail ends;

means for determining a force necessary to move the adjacent ends into a welding position as the adjacent rail ends close and during flashing of the adjacent rail ends due to the current flow, said force determining means including means for measuring a distance of movement of the adjacent rail ends as the adjacent rail ends close and flash due to the current flow;

means for adding the determined force to a predetermined upset force to determine a total forging force; and means for forging the adjacent rail ends into a weld joint using the total forging force.

18. The apparatus as defined in claim 17 wherein the means for measuring the distance of movement further comprises means for correlating the measured force to the measured distance.

19. The apparatus as defined in claim 18 wherein the means for correlating the measured force to the measured distance further comprises means for determining an elastic constant from a change in measured force per change in unit distance.

20. The apparatus as defined in claim 19 wherein the means for correlating the measured force to the measured distance further comprises means for determining a drag force from a relatively constant measured force observed over at least a portion of the measured distance.

21. The apparatus as defined in claim 19 wherein the means for determining the force necessary to move the adjacent ends further comprises means for selecting the drag force when available and otherwise the elastic constant.

22. The apparatus as defined in claim 21 wherein the means for determining the force necessary to move the adjacent ends further comprises multiplying the elastic constant by the measured distance.

23. The Apparatus for weld joining adjacent rail ends comprising:
- a welding power source for applying electrical power to the adjacent rail ends while simultaneously effecting relative closing movement between the rail ends through actuating means so as to bring the rail ends into position to effect current flow between the rail ends;
- a first processor for determining a force necessary to move the adjacent ends into a welding position as the adjacent rail ends close and during flashing of the adjacent rail ends due to the current flow;
- a second processor which adds the determined force to a predetermined upset force to determine a total forging force;
- a forging actuator which forges the adjacent rail ends into a weld joint using the total forging force; and
- a size-of-rail processor which selects an upset force per unit area and which determines the predetermined upset force by multiplying the upset force per unit area by a cross-sectional area of the adjacent rail ends.

24. The apparatus as defined in claim 23 further comprising a welding processor which terminates the current flow before forging the adjacent rail ends into the weld joint.

25. The apparatus as defined in claim 24 further comprising a power meter which measures a total power input to the adjacent rail ends and terminating the current flow when the total power absorbed by the adjacent rail ends exceeds a predetermined power threshold.

26. The apparatus as defined in claim 23 further comprising a position sensor which measures a total upset distance of closing of the rail ends during forging after the termination of the current flow.

27. The apparatus as defined in claim 26 further comprising a quality control processor which specifying a range of predetermined upset distances and which rejects the weld joint where the measured upset distance of forging exceeds the range of predetermined upset distances during a measured upset time period.

28. The apparatus as defined in claim 23 wherein the first processor which determines a force necessary to move the adjacent ends further comprises a position sensor which measures a distance of movement of the adjacent rail ends as the adjacent rail ends close and flash due to the current flow.

29. The apparatus as defined in claim 28 wherein the position sensor measuring the distance of movement further comprises a force analysis processor which correlates the measured force to the measured distance.

30. The apparatus as defined in claim 29 wherein the force analysis processor which correlates the measured force to the measured distance further comprises means for determining an elastic constant from a change in measured force per change in unit distance.

* * * * *